United States Patent [19]
Aindow et al.

[11] Patent Number: 5,934,043
[45] Date of Patent: *Aug. 10, 1999

[54] WEB CUTTING APPARATUS

[75] Inventors: Alan Michael Aindow, Hilo, Hi.; Andrew John Cleall; Philip Gordon Haddow, both of Coventry, United Kingdom; David Robert Seaward, Birmingham, United Kingdom; Geoffrey William Vernon; Peter Ernest Willett, both of Bucks, United Kingdom; Stephen William Bird, Peterborough, United Kingdom

[73] Assignee: Molins PLC, Milton Keynes, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/481,306
[22] PCT Filed: Dec. 23, 1993
[86] PCT No.: PCT/GB93/02645
§ 371 Date: Jun. 23, 1996
§ 102(e) Date: Jun. 23, 1996
[87] PCT Pub. No.: WO94/14583
PCT Pub. Date: Jul. 7, 1994

[30] Foreign Application Priority Data

Dec. 24, 1992 [GB] United Kingdom .................... 9226932

[51] Int. Cl.[6] ..................................................... B65B 51/10
[52] U.S. Cl. .................... 53/371.4; 53/DIG. 2; 53/374.6; 83/956

[58] Field of Search ...................... 156/515, 251, 156/731, 73.3, 73.4, 580.1; 83/701, 956; 53/DIG. 2, 476, 374.6, 371.4, 450, 550

[56] References Cited

U.S. PATENT DOCUMENTS

| | | | |
|---|---|---|---|
| 3,272,682 | 9/1966 | Balamulth | 156/580 |
| 3,308,003 | 3/1967 | Reans | 156/580 |
| 3,312,134 | 4/1967 | Roney | 83/349 |
| 3,438,295 | 4/1969 | Heinz et al. | 83/98 |
| 3,939,033 | 2/1976 | Grgach et al. | 156/580 |
| 4,043,094 | 8/1977 | Bohannon, Jr. | 53/450 |
| 4,517,780 | 5/1985 | Kreager | 53/552 |
| 4,713,132 | 12/1987 | Abel et al. | 156/73.1 |
| 4,765,118 | 8/1988 | Akutsu | 53/551 |

Primary Examiner—James F. Coan
Assistant Examiner—Gene L. Kim
Attorney, Agent, or Firm—Antonelli, Terry, Stout & Kraus, LLP

[57] ABSTRACT

Transverse cuts are made in a web using a cutter/anvil combination which is subjected to high frequency vibration, preferable ultrasound. In one arrangement, particularly for cutting tea bag webs, a rotary cutter drum (4) cooperates with an ultrasonically-vibrated anvil 12. The web may be simultaneously sealed and cut by means of a modified drum (202) having sealer/cutter elements (208, 210). In other arrangements, particularly for cutting cork paper on a machine for assembling filter cigarettes, the paper is severed on a drum (106, 122, 192, 350) cooperating with an ultrasonically-vibrated anvil (110, 194, 312) or directly on an ultrasonically-vibrated drum (144, 160, 170, 180).

36 Claims, 9 Drawing Sheets

WEB CUTTING APPARATUS

This invention relates to web cutting apparatus, particularly but not exclusively as employed for severing webs in packaging or wrapping processes.

According to one aspect of the invention apparatus for making successive longitudinally spaced cuts in a web comprises means for moving the web, means for periodically bringing a cutter into the region of the web, and means for producing high frequency relative vibration between the cutter and the web, so that the cutter makes at least one cut, having at least a portion extending in a transverse direction of the web. The vibration may have a primary amplitude transverse to the web, either in its thickness direction or across its width, or its primary direction may be longitudinal relative to the web. Preferably the cutter cooperates with an anvil (which term is used herein to include any counter surface) and the vibration producing means produces relative vibration between the cutter and the anvil. Preferably the vibration producing means comprises an ultrasound generator. In a preferred arrangement the anvil is subjected to ultrasound vibration, although the cutter itself may be vibrated, either in a direction across the web width (i.e. in a sawing action) or in a direction parallel to the thickness of the web (in a crush-cut action).

The cutter is preferably moved with the web, (e.g. by being mounted on a roller), although it need not move at the same speed as the web. The anvil may be stationary (apart from the generated vibration) or may move with the web or the cutter, although again not necessarily at the same speed. The device may be arranged to sever portions of the web from the remainder of the web, e.g. by severing successive leading portions. Where the anvil is a movable member, e.g. a rotary drum, sections severed from the web may be subsequently conveyed on the anvil. Alternatively, where the cutter is mounted on a movable member the severed sections could be subsequently conveyed on the member.

In one application the invention is embodied in a machine for producing packages containing tea or other infusible material. Thus, a double ply web containing spaced portions of infusible material may be subjected to cutting by a device according to the invention in which the cutter has a cutting edge which surrounds the portion of infusible material and cuts it out from the web. The cutting edge may thus define the shape of the package containing infusible material produced from the web. It will be understood that the edges of any such package have to be sealed to prevent the infusible material escaping. Sealing may be carried out by rollers or other suitable means arranged upstream of the cutting device and synchronised with it so that the web is cut in a region such that the cut edge or edges of the packet are separated from the infusible material by a sealed portion of web.

As an alternative to providing such separate sealing means, and in accordance with another aspect of the invention, a cutting device (which may be, but is not necessarily, constructed in accordance with said one aspect of the invention) comprises means for performing a sealing operation on an adjacent portion of the web substantially simultaneously with the cutting operation. In this case, the device preferably performs sealing and cutting with the assistance of ultrasound. A suitable cutting and sealing element, which could be carried by a rotary drum for cooperation with a stationary ultrasonically-vibrated anvil comprises a relatively flat portion for sealing and a relatively narrow edge portion e.g. abutting the flat portion, for cutting. Preferably the sealing portion is arranged to contact a downstream portion of the web relative to the cutting edge. Where sealing and cutting are carried out in separate processes with the sealing operation performed on the web upstream of the cutting operation, in order to provide adequate tolerance for registration at the cutting operation the sealing width may need to be wider than strictly necessary to provide an adequate seal. By combining the cutting and sealing operations, problems of registration are avoided and there is a potential materials saving by reducing the width of the seal.

It is preferable to control the relative spacing between a cutter and anvil for effective cutting of a web of predetermined thickness. In a device for cutting a two ply web of heat-sealable filter paper for making tea bags, having a thickness of web to be cut of about 0.075 mm, a mean spacing between a rotary cutter having a diameter of about 135 mm and a stationary anvil of about 0.04 mm has been found to be effective using an ultrasonic generator which produced ultrasound vibrations in the anvil having an amplitude (peak to peak) of about 0.07–0.08 mm in a direction transverse to the web. A preferred frequency for the ultrasound vibration is 20 kHz. Higher frequencies (e.g. 40 kHz) are usable and may be desirable for very high speed operation but maintaining adequate amplitude of vibrations at higher frequencies uses more power. Frequencies lower than 20 kHz (i.e. below those normally recognised as ultrasound) may be used, but particularly with high speed machinery the advantages gained by providing vibration at lower frequencies, as compared with providing no vibration, may be marginal. With the arrangement described above, with a web speed of about 1.2 meters/second, the web is subjected to 30–40 cycles of ultrasonic vibration while the knife is in contact with it.

Means may be provided for adjusting the spacing between an anvil and a cutter, preferably by sensing the distance between the anvil and cutter (or parts movable with them) and by moving the anvil in response to the sensed distance. In practice it may be difficult to obtain measurements directly from a member which is subject to vibration; the adjusting means may therefore include control means (which may include software) for adjusting the spacing according to parameters which relate indirectly to the spacing. Thus, adjustment could be made according to a mapped position profile against time after start up to compensate for thermal expansion, or against a number of cuts made to compensate for wear in the cutter and/or anvil.

The spacing between the anvil and the cutter may be set by spacing means. In a preferred arrangement wherein the cutter is carried on a rotary drum, the spacer means comprises one or more control rings carried by the drum and arranged so that their circumference is at a radius from the axis of the drum which bears a predetermined relationship to the radius at which the cutting edge of the knife is carried. The rings could have the same radius as that of the cutting edge of the knife, so that the control rings maintain the anvil at a distance from the general surface of the knife drum which is equal to the radial distance by which the knives project from that surface. The anvil, which may be stationary or could comprise a further drum, and the knife carrying drum may be resiliently urged together, with the control rings setting the spacing between the anvil and the drum, and hence between the anvil and the knives.

In another application of cutting apparatus according to the invention, the apparatus is employed in a machine for assembling filter cigarettes, for cutting the filter tipping paper (so called "cork" paper) which is wrapped around axially aligned assemblies of filter and tobacco rods to produce filter cigarette assemblies.

In one preferred arrangement a web of filter tipping paper is delivered at a controlled speed to a suction and cutting drum which is rotating at a faster speed than the web, the drum carrying knives which cooperate with a vibrating anvil to sever successive leading sections of the filter paper. These sections are subsequently conveyed on the drum towards a rolling plate at which they are wrapped and united around the filter and tobacco rods. A similar arrangement is usable to unite other rod-like articles of the tobacco industry.

Adhesive may be applied to the web upstream of the drum, to either face of the web. Where the adhesive is on the face of the web which contacts the anvil the latter will probably require cleaning means to remove adhesive which is transferred to it from the web. Where the adhesive is applied to the surface of the web which contacts the suction and cutting drum, the adhesive is preferably applied to the web in a pattern which leaves regions with no adhesive, the suction ports on the drum being arranged to coincide with these regions so as to minimise transfer of adhesive to the drum. Cleaning means, such as a brush and/or suction, may be provided for the drum. Where the wrapper sections are carried on the drum with the adhesive outermost the sections may be supplied directly to the region of a rolling plate for uniting the filter cigarette assemblies. In order to prevent damage occurring to the assemblies at the rolling plate from the protruding knives of the drum the knives may be arranged to be retractable, e.g. by mounting them on radial slides operated by a central cam.

Instead of applying adhesive to the web the adhesive could be applied to the sections after cutting: this would have the advantage of eliminating the need to clean the anvil but would involve a more complicated adhesive applying means which is capable of applying adhesive to spaced sections on the drum.

Instead of using a stationary anvil a rotary ultrasonically vibrated anvil may be used. The vibrations set up in the anvil may, according to its design, be radial or circumferential. In either case the anvil preferably cooperates with a drum carrying the or each cutter. Severed wrapper sections may be conveyed away on the rotary anvil or on the cutter drum. Where a rotary anvil is employed a central or core ultrasound generator may cooperate with a number of generally radial spokes forming ultrasound boosters the ends of which form the anvil surfaces against which the cutter or cutters operate. Conveniently this form of rotary anvil may comprise a drum with the end faces of the spokes flush with the general circumference of the drum.

The invention will be further described, by way of example only, with reference to the accompanying diagrammatic drawings, in which.

Figures 1, 2:
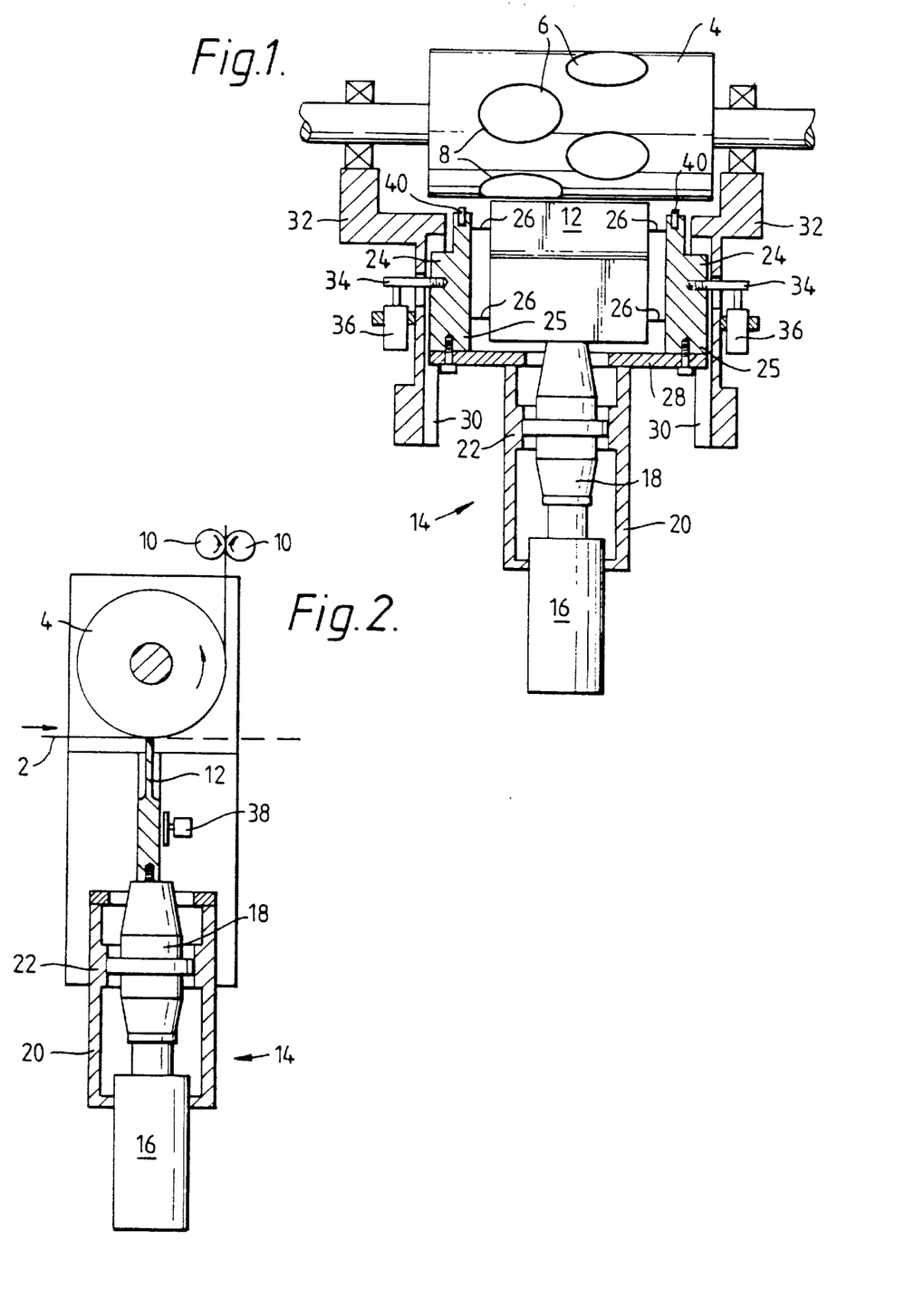
FIG. 1 is a part-sectional view of a web cutting device taken along a line transverse to the web.
FIG. 2 is a part-sectional view of the device of FIG. 1 taken along a line parallel to the web.

FIGS. 1 and 2 show a web cutting device for use in a machine for cutting out round bags from a two-ply web 2 having spaced portions containing tea or other infusible material. The general construction and operation of the machine forms no part of this invention but reference is directed to PCT patent specification No. WO 90/13487 for details of a machine with which the device is usable.

The web 2 is conveyed beneath a cutting roller 4 which is provided with recesses 6 surrounded by raised cutting edges 8. The web 2 is maintained under tension and conveyed past the roller 4 by nip rolls 10 which are synchronised with the roller so that the speed of the web and the peripheral speed of the roller are matched. The roller 4 is synchronised with means (not shown) for sealing the two plies of the web 2 together in a peripheral region around each portion containing infusible material, so that these portions coincide with the recesses 6 at the roller 4 and the peripheral regions coincide with the cutting edges 8.

An anvil 12 is situated beneath the roller 4 and has an upper face which is spaced closely to the periphery of the roller and which provides a surface against which the cutting edges 8 operate. The anvil 12 forms part of an ultrasonic device 14, which also comprises an ultrasonic generator 16 containing piezoelectric material and a part 18 comprising a booster for amplifying the ultrasound generated by the generator and for transmitting it to the ultrasonic horn or anvil 12. A commercially available device suitable for performing the function of the device 14 is Model 902R available from Branson Ultrasound of Hayes, Middlesex, England. The anvil 12 is constructed of a mechanically-suitable material capable of withstanding the ultrasound vibrations without suffering from fatigue. Typically the material may be suitable alloys of titanium (e.g. Al6Va4) or aluminium (e.g. He15). Depending on its dimensions the anvil 12 may have one or more longitudinal slots (not shown) extending parallel to its axis: such slots may be required where the width of the anvil is more than about two thirds of its length. The booster 18 could be incorporated within the anvil 12: this has the advantage of making the device 14 shorter.

The ultrasound generator 16 is rigidly connected to the lower face of a housing 20. The part 18 is connected to an internal flange 22 in the housing 20, its mounting position being at a node relative to the primary frequency of the ultrasound generated by the device, so that there is little or no relative vibration transmitted to the housing. The anvil 12 has integral side pieces 24 each connected to the main central part of the anvil by upper and lower thin strips or beams 26. The side pieces 24 are connected to a lower plate 28 which is itself connected to the housing 20. The beams 26, which may for example be of 1 mm thickness, allow the anvil 12 to perform ultrasound vibrations transmitted to it from the booster part 18 without transmitting substantial vibrations to the side pieces 24 and hence to other parts of the machine. In other words the beams 26 effectively isolate the anvil 12 dynamically from the remainder of the machine.

The side pieces 24 have outer vertically-extending extensions 25 which are constrained by and vertically slidable in guideways 30 provided at each side in a structural part 32 of the machine. Each side piece extension 25 has an extending pin 34 which is engaged by a movable element of a linear actuator 36 connected to the part 32.

At their upper faces the side pieces 24 carry gap transducers 40 for sensing the distance between the anvil 12 and the roller 4. The transducers 40 may be optical or eddy current transducers. Any deviation from a desired distance may be corrected by operation of the linear actuators 36 to reposition the device 14 relative to the roller 4. After adjustment, the device 14 can be locked in position by clamping the side piece extensions 25 in the guideways 30 by means of pneumatic clamps 38 (FIG. 2). The linear actuators 36 may include rotary encoders by means of which the position of each actuator relating to a datum setting may by determined.

In operation, with a web 2 having a nominal thickness of 0.075 mm, the anvil 12 is placed typically at a mean spacing of 0.03–0.04 mm from the path of the cutters 8. The amplitude of the ultrasonic vibration is typically 0.07–0.08 mm at a frequency of 20 kHz. At a web speed of 1.2 meters/second it is believed that the web is trapped and released some 30–40 times per pass of each portion of cutting edge 8. As compared with operating a cutting roller 4 in conjunction with an anvil or counter-surface not subject to high frequency vibration the device significantly prolongs useful life of the cutting edges 8, particularly by providing an acceptable cut even when the cutting edge is relatively blunt, while the vibration is believed to facilitate relatively smooth passage of the web between the roller 4 and anvil 12.

The effectiveness of the cutting operation is dependent on relatively accurate positioning of the anvil 12. The linear actuators 36 may comprise linear ball screws with high ratio gear boxes to provide location of the anvil 12 which is accurate to within a few microns. The actuators are independently adjustable, depending on signals from the position transducers 40, so as to be capable of adjustment to maintain the anvil parallel to the roller 4. The face of the anvil 12 which cooperates with the cutting edges 8 is subject to wear, typically at a rate of about 1 micron every 150,000 cuts. A higher wear rate may be tolerated, particularly where it is desired to reduce the wear rate of the cutting edges 8: in such case the anvil 12 may be constructed of a material which is softer than titanium, e.g. aluminium. Because of their location, the position transducers 40 do not detect wear: however, the control circuit linking them to the actuators 36 may include means (e.g. embodied in software) for compensating for wear (e.g. by modifying the measured distance according to the number of cuts made since a datum setting of the relative positions of the transducers and the surface of the anvil 12). Similarly, the actuators may need to be controlled according to a mapped movement profile during start-up to compensate for changes in relative position due to thermal expansion as the device is run up to operating temperature: reaching a stable operating temperature from rest may take up to 20 minutes. A typical running temperature for the anvil 12 is 70° C. Effects of thermal expansion can be reduced by reducing the distance between the pins 34 (on which the position actuators 36 operate) and the working face of the anvil 12.

Figure 3:
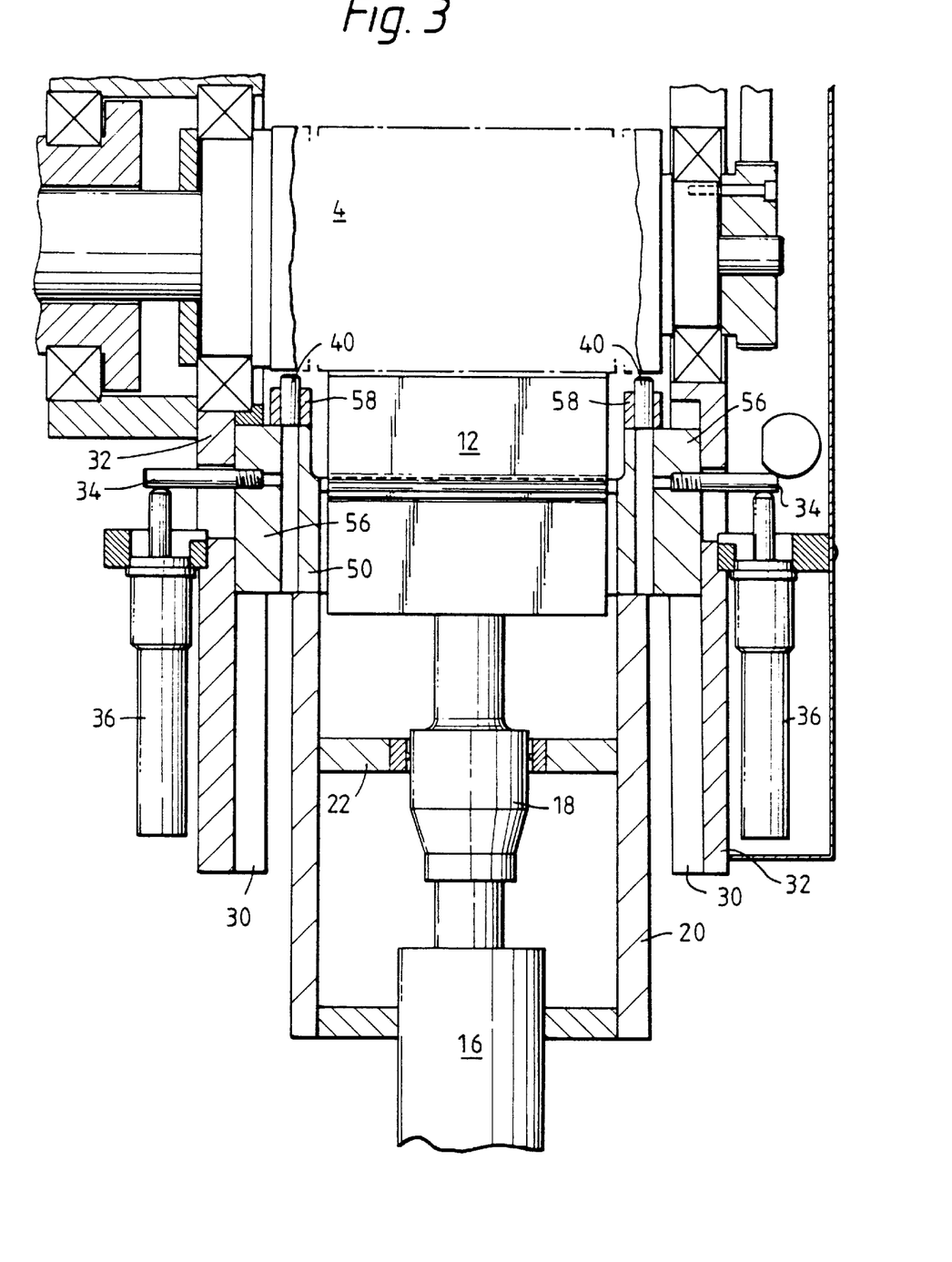
FIG. 3 is a view, similar to that of FIG. 1, of a modified web cutting device.
Figure 4:
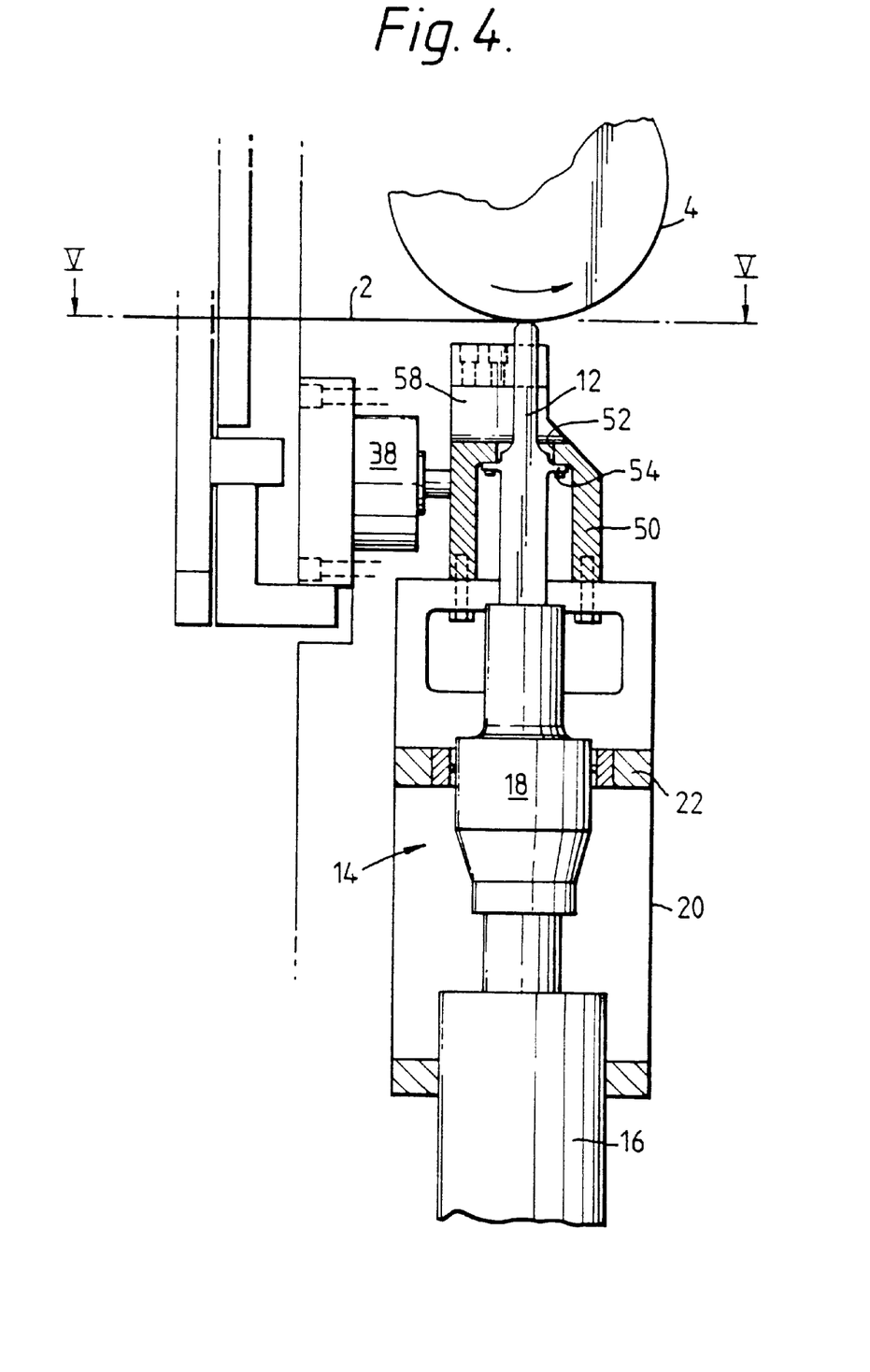
FIG. 4 is a view, similar to that of FIG. 2, of the device of FIG. 3.
Figure 5:
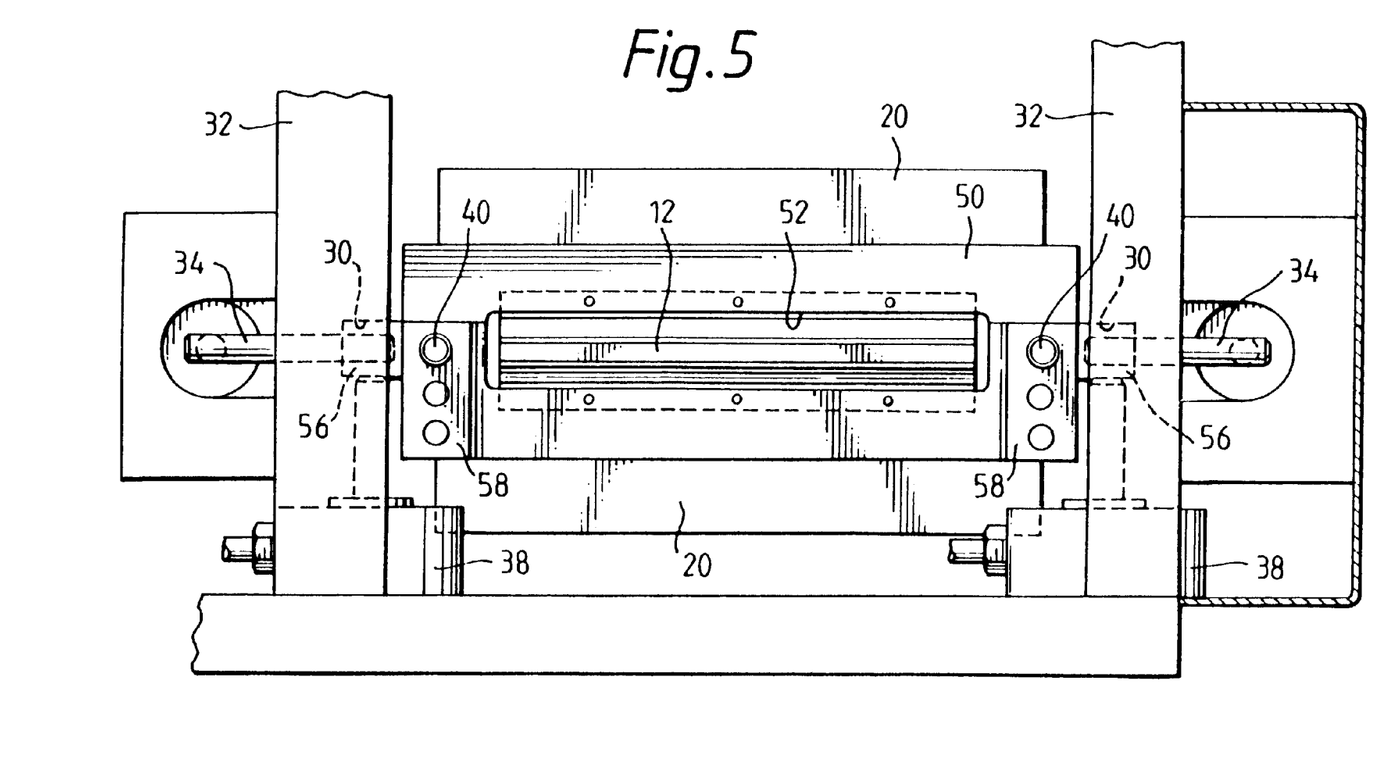
FIG. 5 is a view on the line V—V in FIG. 4.

The device shown in FIGS. 3–5 is similar to that of FIGS. 1 and 2, and similar parts have been given similar reference numbers. The main difference between the devices lies in the mounting of the anvil 12. In the device of FIGS. 3–5 a rectangular housing 50 is connected to the upper surface of the housing 20 and surrounds the lower half of the anvil 12. At its upper end the housing 50 has a slot 52 through which projects the upper part of the anvil 12. Mounting flanges 54 are provided on the anvil 12 and these are connected to the housing 50 on opposite sides of the undersurface of the slot 52. The flanges 54 are positioned at a node in the ultrasound vibration generated in the anvil 12, so that minimum vibration is transmitted to the housing 50. At each side the housing 50 has rectangular extensions 56 which engage in and are slidable in the guideways 30. The housing 50 also has upward extensions 58 at each side of its upper face, these carrying the position transducers 40. Operation of the of device of FIGS. 3–5 is analogous to that of the device of FIGS. 1 and 2.

The web cutting devices depicted in FIGS. 6–13 are applicable to cutting filter tipping paper (commonly known as "cork" paper) in a filter cigarette assembling machine. In this type of machine it is commonplace to feed a web of gummed cork paper at a controlled speed onto a suction drum which is continuously rotating at a faster peripheral speed than the speed of the web. The cork web is transversely cut while on the drum to provide spaced sections which are subsequently conveyed at the speed of the drum. Cutting is usually achieved by means of knives mounted on a separate roller which cooperates with the suction drum. The severed cork sections travel with the drum to a position at which they are picked up by and subsequently rolled around axially aligned filter and tobacco portions to unite them into a filter cigarette assembly. For further details of a filter cigarette assembling machine of this type reference is directed to British patent specification No. 941832.

Figure 6:
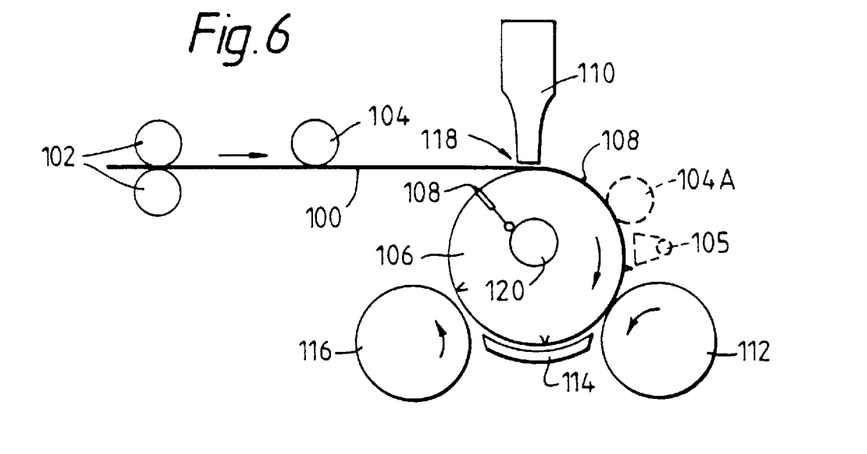
FIG. 6 is a side view of another web cutting device.

In the device of FIG. 6 a web 100 of filter tipping paper is fed at a controlled speed by nip rolls 102 past a gumming roller 104 which applies adhesive (possibly in a predetermined pattern) to the paper. For convenience the adhesive will hereinafter be referred to as "gum", although it will be appreciated that not all suitable adhesives are true gums. The web 100 passes to a suction cutting drum 106 provided with knives 108 which cooperate with an ultrasonically-vibrated anvil 110 to sever the web into wrapper sections subsequently conveyed on the drum. Filter cigarette assemblies to be united are delivered by a fluted drum 112 and are brought together with the wrapping sections on a rolling plate 114 at which the sections are wrapped and sealed around the assemblies. The united assemblies are subsequently conveyed away by a further fluted drum 116.

The anvil 110 may be substantially similar to the anvil 12 in the devices of FIGS. 1 and 2 or FIGS. 3–5, and be incorporated in a device similar to the device 14. The anvil 110 needs continuous cleaning in the region 118 as it will tend to collect some gum from the web 100 in this region. Cleaning can be achieved by a rotary brush and/or suction collection of excess gum on the anvil 110.

The knives 108 typically project about 0.2 mm above the general surface of the drum 106. In order to protect the filter cigarette assemblies at the rolling plate 114 the knives 108 may be mounted in radial slides and actuated by a cam 120 so that they are extended in the region of the anvil 110 but retracted to a position at or below the level of the drum 106 at the rolling plate.

Instead of using gummer 104 to apply adhesive to the web 100 upstream of the anvil 11 0, with attendant cleaning problems, a gummer 104A could be used for applying adhesive to the severed sections of the web. The gummer 104A is synchronised with the passage of wrapper sections on the drum 106, so that adhesive is applied to the sections and not to the drum. Depending on the characteristics of the adhesive, a heater and/or dryer 105 may be required, in view of the closeness of the gummer 104A to the rolling plate 114.

Figure 7:
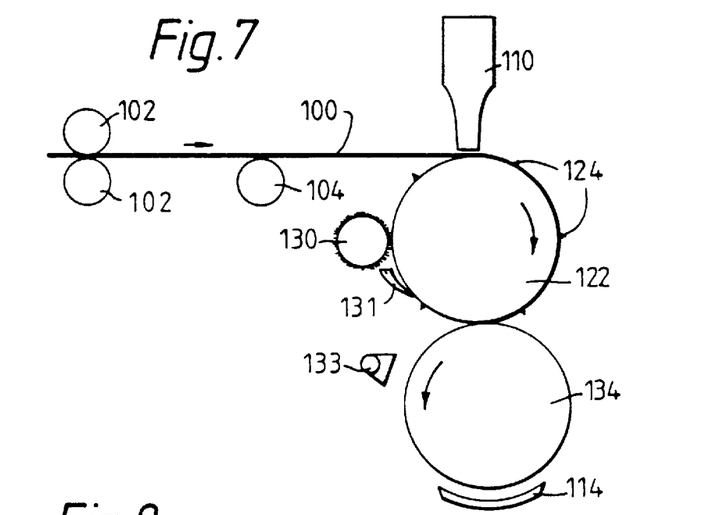
FIG. 7 is a side view of a further web cutting device.
Figure 8:
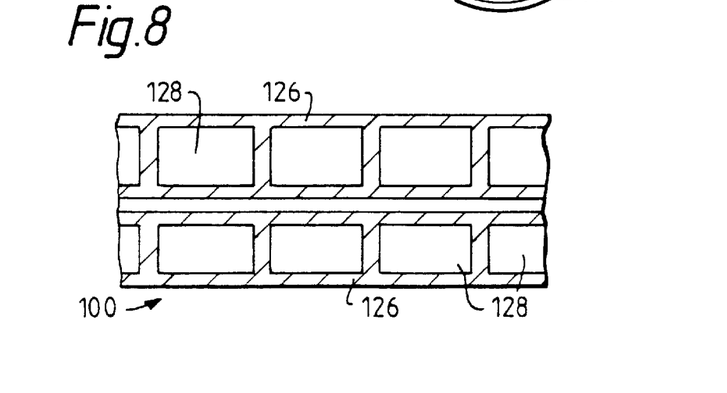
FIG. 8 is plan view of a web in the device of FIG. 7, showing the gummed areas of the web.

In the device of FIG. 7 parts similar to those in the device of FIG. 6 have been given similar reference numbers. The web 100 is gummed by a gummer 104 acting on its undersurface and is delivered to a suction rolling drum 122 which is provided with fixed knives 124. As shown in FIG. 8, the pattern of gum 126 applied to the web 100 includes windows 128 of ungummed paper. By arranging for suction ports on the drum 122 to apply suction only at positions corresponding to the windows 128, transfer of excessive amounts of gum to the surface of the drum can be avoided. A rotary brush 130 removes gum which remains on the knives 124 and any small amounts deposited on the surface of the drum 122. The wrapper sections severed from the web 100 are carried by the drum 122 and transferred to a further suction drum 134 from where they are wrapped around assemblies to be united delivered to the rolling plate 114. Note that in this arrangement gum does not collect on the anvil 110. As a supplement or alternative to the rotary brush 130 a pivoted scraper blade 131 could be used. This could be cam-operated so as to be lifted to avoid the knives 124. Alternatively a wheel with flexible blades, i.e. a flap wheel, could be used.

In an alternative way of operating the embodiment of FIG. 7 the gummer 104 is omitted and the web 100 is precoated with an adhesive (e.g. hot melt or PVA) which is substantially dry by the time the web contacts the drum 122 and which is reactivated by a heater 133 on the drum 134. The brush 130 should not then be necessary.

Figure 9:
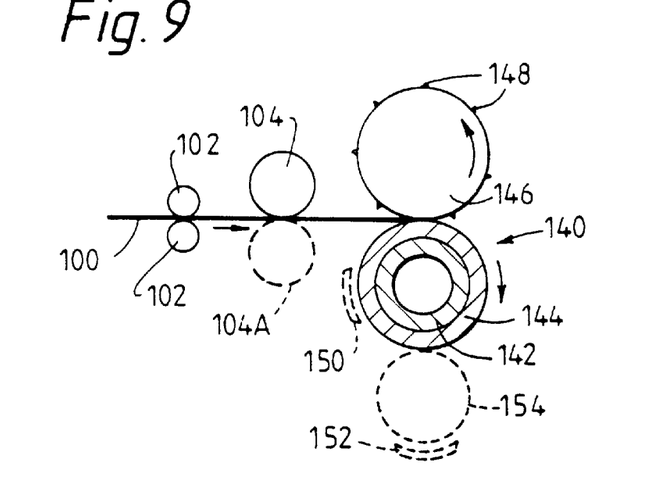
FIG. 9 is a side view of a further web cutting device.

FIG. 9 shows a web cutting device employing an ultrasonically-vibrated rotating cylinder 140 comprising an annular piezoelectric core 142 surrounded by a titanium alloy sleeve 144 which acts as a booster for the ultrasonic vibrations. The cylinder 142 oscillates in a circumferential oscillation mode (as opposed to a radial or wall thickness changing mode). Cooling fluid is passed through the centre of the core 142.

A web 100 is delivered at a controlled speed by nip rolls 102 and receives gum from a gummer 104. A suction cutting drum 146 provided with spaced cutting knives 148 is opposed to the cylinder 140 and cooperates with it to produce cut wrapper sections which are conveyed away by the drum 146 to a rolling plate (not shown). The surface of the titanium alloy sleeve 144 is hardened to resist damage from the knives 148. The drum 146 and knives 148 may be similar to the drum 106 and knives 108 of the device shown in FIG. 6.

The cylinder 140 may be provided with suction instead of the drum 146 so that the cut wrapper sections are conveyed away by the cylinder. In this case the uniting of the wrapper sections and filter cigarette assemblies may take place at a rolling plate 150 cooperating directly with the cylinder 140 or at a rolling plate 152 cooperating with a further suction drum 154 which receives wrapper sections from the cylinder. In this last case the gummer 104 is replaced by a gummer 104A acting on the undersurface of the web 100. The suction regions of is the cylinder 140 may be arranged to coincide with areas of ungummed web, as explained with reference to FIGS. 7 and 8. As compared with the previous embodiments the FIG. 9 arrangement has the advantage that the ultrasound device 140 is movable with the web 100.

Figure 10:
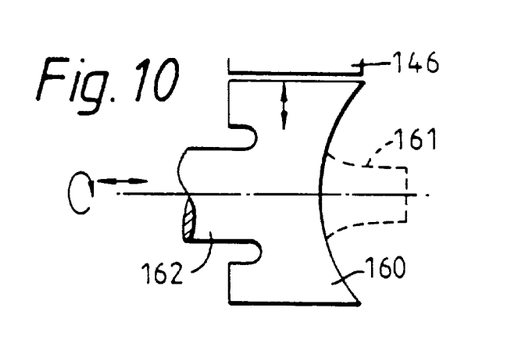
FIG. 10 is a side view of a modified roller for use with the device of FIG. 9.

FIG. 10 is aside view of a modified cylinder 160, which may replace the cylinder 140 in the device of FIG. 9. The cylinder 160 consists of a titanium alloy ultrasonic horn formed with an integral subshaft 162 which is attached to an ultrasonic generator and booster (not shown). The generator and booster rotate at the speed of the cylinder 160, with slip ring electrical contacts and air supply (for suction on the surface of the cylinder and also for air cooling). The cylinder 160 is designed such that ultrasound vibrations generated along the axis of the cylinder are converted into vibrations perpendicular to this axis, i.e. radial vibrations. This transverse vibration may be supplemented by cantilever mounting of the cylinder 160 so that it has a resonant frequency within the range of the frequency of the ultrasonic vibration. Alternatively, the cylinder 160 may have a coaxial support shaft 161. The form of the cylinder 160 could be similar to the ultrasonic transducer disclosed in British patent specification No. 1524924, to which reference is directed for details.

In the embodiment of FIGS. 9 and 10 the cylinders 140 and 160 need not be the anvils: they could carry the cutting knives.

Figure 11:
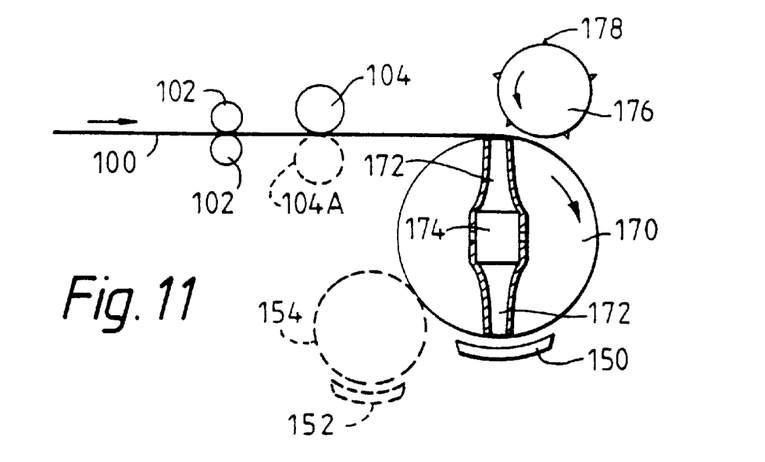
FIG. 11 is a side view of a further web cutting device.

In the device shown in FIG. 11 a web 100 is delivered to a suction cylinder 170 having two cutting stations defined by the end faces of two ultrasonic boosters 172 which are connected to a central common ultrasonic generator 174 which causes the faces of the boosters to vibrate in a radial direction relative to the cylinder 170. A knife cylinder 176 having one or more knives 178 cooperates with the cylinder 170 so that the web 100 is cut when a knife is opposed to an end face of one of the boosters 172. The wrapper sections severed from the web 100 are conveyed by the cylinder 170 to a rolling plate 150. Alternatively, the web 100 is gummed on its undersurface by a gummer 104A and the severed wrapper sections are transferred to a further suction drum 154 for uniting filter assemblies at a rolling plate 152. The wrapper sections could be conveyed by a modified cylinder 176 (provided with suction) instead of by the cylinder 170, i.e. in a way similar to that described with reference to FIG. 9.

Figures 12, 13, 14:
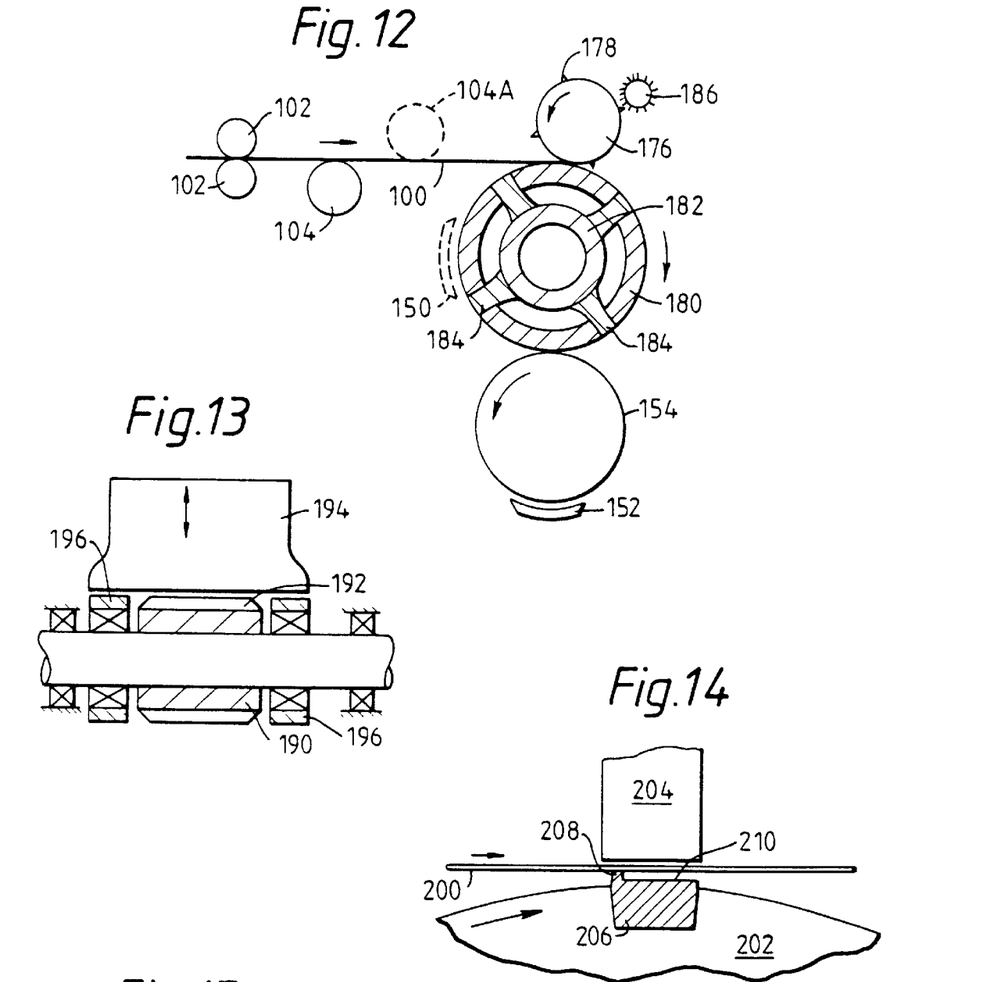
FIG. 12 is a side view of a still further web cutting device.
FIG. 13 is a transverse sectional view of a modification of the web cutting device of FIG. 7.
FIG. 14 is a side view of part of a web cutting and sealing device.

The device of FIG. 12 is similar to that of FIG. 11 except that the cylinder 170 is replaced by a modified ultrasonic cylinder 180, which comprises a central piezoelectric tubular core 182 forming part of an ultrasonic generator, and a series of radial titanium spokes 184 forming ultrasonic boosters and having their radially outermost faces hardened and substantially flush with the general surface of the cylinder so as to form anvils against which the knives 178 operate. Cut wrapper sections may be conveyed to a rolling plate 152 by way of a further suction drum 154, or directly to a rolling plate 150 if the web is gummed by an upper gummer 104A. In this latter case a brush 186 is provided to remove excess gum from the knife drum 176 and knives 178.

FIG. 13 shows a sectional view of a knife drum 190 having knives 192 cooperating with a stationary ultrasonic anvil 194. Thus the drum 190 and anvil 194 may be similar to and replace the drum 122 and anvil 110 in the device of FIG. 7, for example. Alongside the drum 190 are laterally spaced control rings 196, which are ground to the same or similar diameter as that of the drum 190 measured at the outer edges of the knives 192 and act as a stop for the anvil 194 at times when a cut is not being made. The anvil 194 could be resiliently preloaded against the control rings 196: this can avoid having to make adjustments to compensate for thermal expansion of the anvil during the period following start up.

Control rings similar to the rings 196 could be used with a rotary ultrasonic anvil, e.g. any of the cylinders 144, 160, 170, and 180, shown in FIGS. 9–2.

FIG. 14, which is not to scale, is an enlarged side view of a modified web cutting device capable of sealing and cutting substantially simultaneously. The device is particularly usefully applied in the apparatus of FIGS. 1 and 2 or FIGS. 3–5, where usually the double ply web 2 is sealed by separate web sealing rollers upstream of the cutting rollers 4. Use of the device shown in FIG. 14 avoids the need for separate sealing rollers.

A web 200, which may comprise a double ply web containing spaced regions of infusible material, is advanced between a cutting and sealing roller 202 and a stationary ultrasound anvil 204. The roller 202 carries cutting and sealing elements 206 which define the shape of the portion of web to be sealed and cut out. Thus the elements 206 may define an enclosed region, e.g. having a circular periphery similar to the edges 8 in the FIG. 1 device, or could extend transversely so that only transverse cuts and seals (e.g. severing the web) are made by the elements 206. In this instance one or more longitudinal seals in the web to complete the enclosure of each portion to be cut out may be made by other means (not shown), preferably upstream of the roller 202.

The elements 206 comprise a narrow cutting edge 208 having a width of about 0.1 mm and a relatively wide shoulder 210 having a width of about 4 mm. The edge 208 projects about 0.05 mm above the shoulder 210 and the latter projects about 0.02 mm above the general circumference of the roller 202. The pressure and heat generated between the shoulder 210 of the element 206 and the ultrasonic anvil 204 causes sealing of the double ply web 200, which for this purpose may be formed from thermally weldable material or may be preprinted at appropriate positions with an adhesive which is susceptible to activation or setting by application of heat. The edge 208 provides a localised increased action against the web 200 and anvil 204, sufficient to sever the web. The shoulder 210 need not be flat, and could have a convex surface for effecting sealing of the webs.

Figure 15:
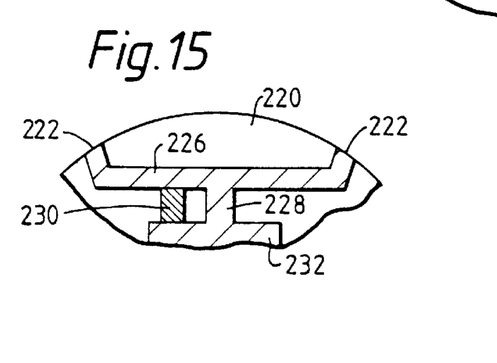
FIG. 15 is a part-sectional view of a modified roller for use in a web cutting device.

FIG. 15 shows part of a modified roller 220, which may replace any of the rollers 144, 160, 170 or 180 in the previously-described embodiments. The roller 220 includes anvils 222 formed at end faces of an ultrasonic beam 226 which is cantilevered from an integral central upstanding strut 228. A piezoelectric stack, forming an ultrasonic generator 230, is arranged between one arm of the beam 226 and an integral base 232. The amplitude of the vibrations at the generator 230 is effectively amplified at the anvils 222 by flexing of the beam 226 about its connection to the strut 228. The roller 220 has additional similar anvils 222 (not shown) arranged symmetrically around its circumference. An additional piezoelectric stack could be provided on the opposite side of the strut 228, to balance the stack forming the generator 230.

Figure 16:
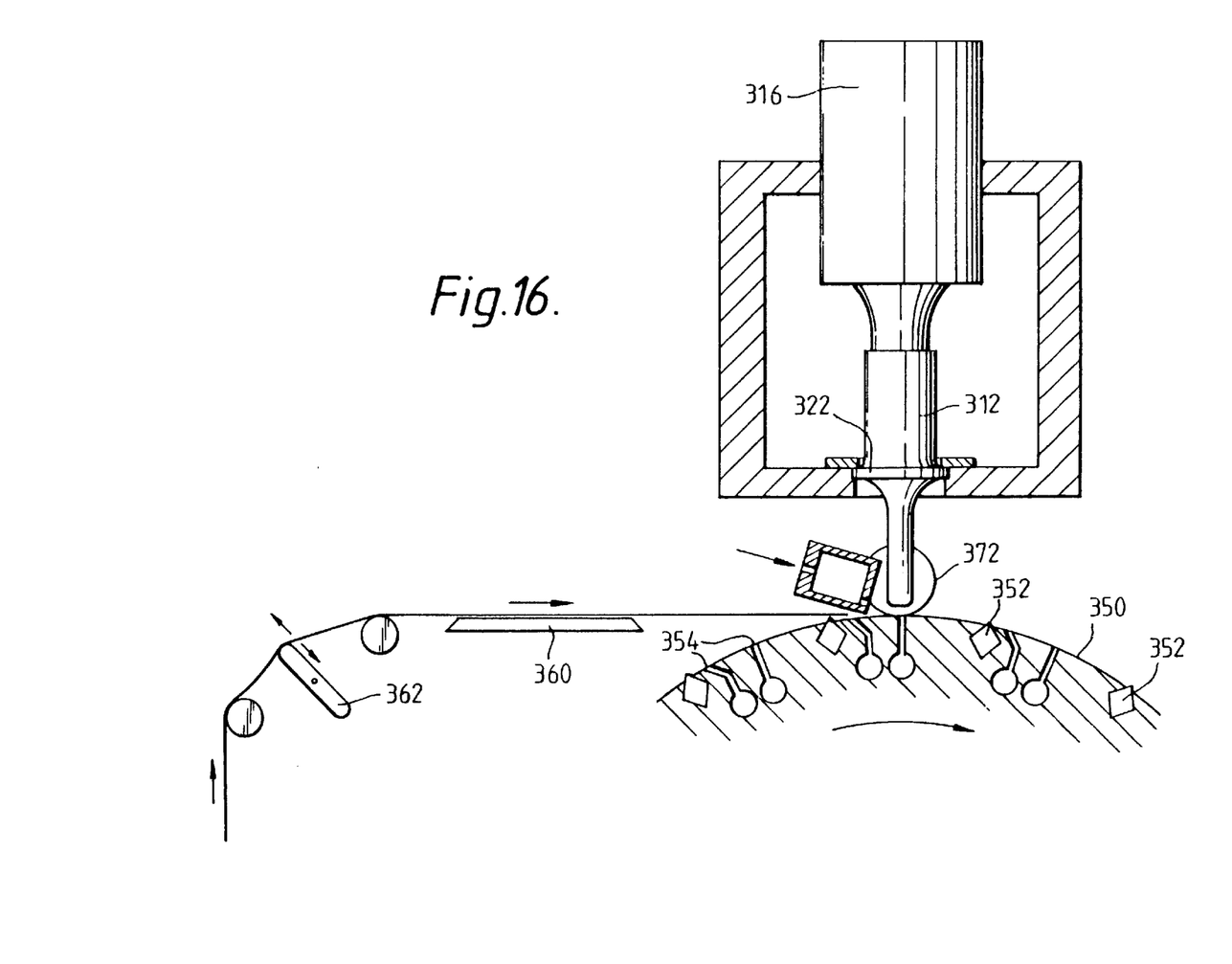
FIG. 16 is a view, similar to that of FIG. 1, of a further modified web cutting device.
Figure 17:
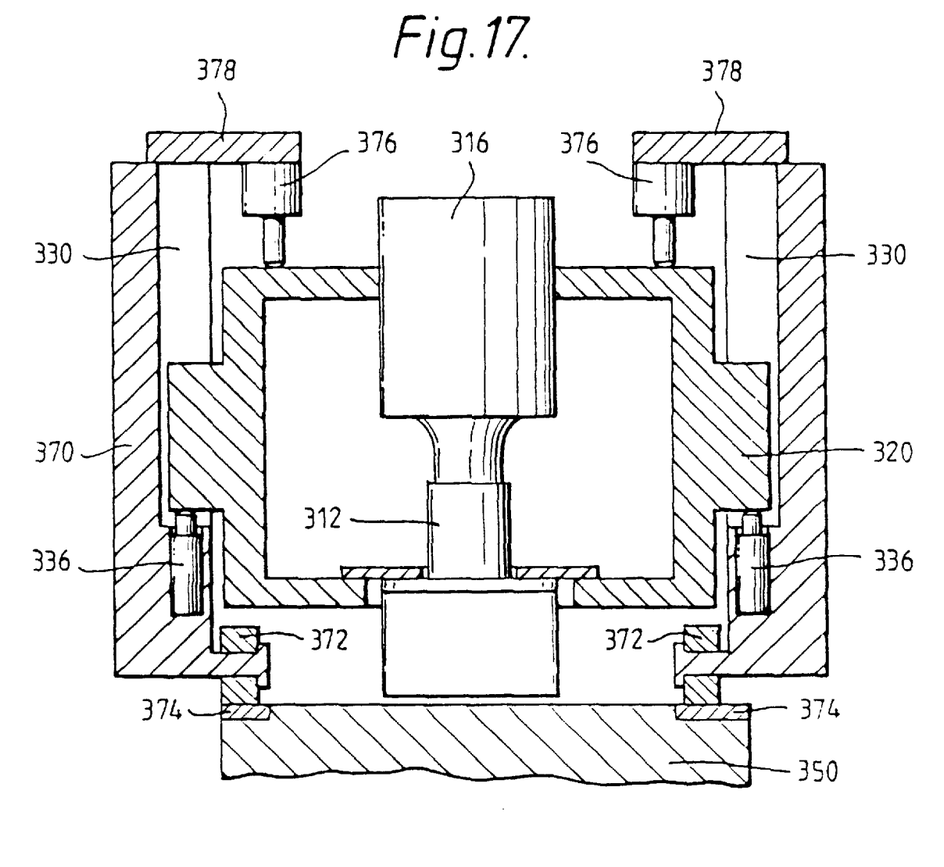
FIG. 17 is a view, similar to that of FIG. 2, of the device of FIG. 16.

The device shown in FIGS. 16 and 17 has many similarities with the devices of FIGS. 1 and 2 and FIGS. 3–5. The device includes an ultrasound generator 316 mounted in a housing 320 and connected to a horn or anvil 312 which is clamped to the housing at a nodal flange 322. The lower end of the anvil 312 is located just above the surface of a suction drum 350 which carries spaced knives 352 for severing successive leading sections from a web 100, the drum including suction holes 354 for retaining the severed web sections on the drum after cutting. Close to the upstream edge of the lower end of the anvil 312 is an air nozzle 356 including a slit 358 from which an air jet is directable at the region of the surface of the drum 350 just upstream of and adjacent the anvil. The slit 358 extends for at least the width of the web 100, and preferably for the width of the anvil 312. An air jet issuing from the slit 358 has been found beneficial in locating the web on the surface of the drum 350 just prior to severing between the knives 352 and the anvil.

The web 100 is gummed on its upper surface at a position upstream of the drum 350, the web passing over a heating and/or drying element 360. Providing a bevelled or chamfered surface on the upstream lower edge of the anvil 312 reduces problems associated with build up of gum on the anvil. Where such a bevelled or chamfered upstream edge is provided for the anvil 312 it is preferred to provide a similarly-shaped downstream edge. The effect of the air jet issuing from the slit 358 in maintaining the web on the drum 350 is also believed to be beneficial in reducing problems with build up of gum on the anvil.

A simple web speed modulator 362 is shown in FIG. 17. This comprises an element which is rotatable or reciprocable periodically and is synchronised with the drum 350 to deflect the web and so modulate the path of the web 100 that it travels at the same speed as the drum at the instant when a knife 354 is passing the anvil 312 but at a lower speed at other times.

The housing 320 is slidable in guideways 330 in an adjuster frame 370. The position of the housing 320, and hence of the anvil 312, relative to the frame 370 is controlled by microadjusters or linear actuators 336. The frame 370 carries cam rollers 372 which bear on annular hardened circumferential inserts 374 carried by the drum 350. Load cylinders 376 are arranged between a machine frame part 378 and the housing 320, the arrangement being such that the cylinders apply a predetermined load through the housing and the frame 370 to the rollers 372. The microadjusters 336 thus effectively set the gap between the surface of the drum 350 (or more correctly the locus of the knives 352) and the lower edge of the anvil 312.

A device similar to that disclosed in FIGS. 16 and 17 may be used in the embodiments of FIGS. 6 or 7, or to replace the device of FIGS. 1 and 2 or FIGS. 3–5 in any of the previously-described embodiments.

Although specific mention has been made of ultrasound generators including piezoelectric material the ultrasound could be generated in any convenient manner and using any suitable material. For example magnetostrictive material could be used: this may have advantages as it can be structurally stronger than piezoelectric material.

We claim:

1. Apparatus for making successive longitudinally-spaced cuts in a web, comprising means for moving the web, means for periodically bringing a cutter into the region of the web, the cutter being carried by a rotary drum and cooperating with an anvil in a cutting region, and means for producing high frequency relative vibration between the cutter and the web, so that the cutter makes at least one cut having at least a portion extending in a direction transverse the web, wherein the cutter is arranged to sever successive portions of the web from the remainder of the web, said rotary drum carrying a plurality of said cutters in equally spaced peripheral positions, said drum being provided with suction means for retaining said portion in spaced positions between said cutters on the periphery of said drum after severing, and means for transferring said spaced portions from said drum at a position angularly displaced from said position at which said portions are severed from the web, including adjustable means for mounting the anvil so as to adjust the spacing between the anvil and the cutters, said adjustable means including means determining said spacing including rotatable means acting between the anvil and the drum.

2. Apparatus as claimed in claim 1, wherein the vibration producing means comprises an ultrasound generator.

3. Apparatus as claimed in claim 1 or claim 2, wherein the primary amplitude of the vibration is transverse to the web.

4. Apparatus as claimed in claim 1, wherein the vibration producing means produces relative vibration between the cutter and the anvil.

5. Apparatus as claimed in claim 4, wherein the vibration producing means comprises an ultrasound generator linked to the anvil.

6. Apparatus as claimed in claim 5, wherein the anvil includes an end surface for cooperating with said cutter, said surface extending for the width of the web and having a relatively narrow dimension in the direction of movement of the web.

7. Apparatus as claimed in claim 6, wherein said surface is bevelled at least along its edge which is upstream relative to the direction of movement of the web.

8. Apparatus as claimed in claim 4, wherein said adjustable means includes at least one linearly movable adjustment means.

9. Apparatus as claimed in claim 5, wherein the anvil comprises a rotary member and the ultrasound generator is arranged to produce vibrations which are radial relative to said rotary member.

10. Apparatus as claimed in claim 4, wherein the vibration producing means comprises an ultrasound generator linked to the cutter.

11. Apparatus as claimed in claim 10, wherein the ultrasound generator is arranged to produce vibrations which are radial relative to said rotary drum.

12. Apparatus as claimed in claim 9 or 11, wherein the ultrasound generator is arranged to produce radial vibrations in an annular peripheral part of said rotary member or drum.

13. Apparatus as claimed in claim 9 or 11, wherein the ultrasound generator is arranged to produce radial vibrations in at least one radially extending member of said rotary member or drum.

14. Apparatus as claimed in claim 4, further including means for directing an air jet in the vicinity of said cutting region so as to assist in maintaining said web in a preferred cutting position in said region.

15. Apparatus as claimed in claim 14, wherein said anvil is linked to an ultrasound generator, wherein said air jet directing means is arranged to assist maintaining said web on the surface of said rotary drum.

16. Apparatus as claimed in claim 4, wherein the cutter is arranged to sever successive portions of the web from the remainder of the web.

17. Apparatus as claimed in claim 16, wherein the cutter has a cutting edge arranged to sever portions of predetermined closed shape from the web.

18. Apparatus as claimed in claim 16 or claim 17, wherein the web comprises at least two layers of material carrying spaced doses of material to be packaged between the layers and said severed portions of the web correspond to individual packages containing said material to be packaged.

19. Apparatus as claimed in claim 18, including means for sealing the web adjacent at least part of the peripheral margin of the severed portions.

20. Apparatus as claimed in claim 19, wherein said sealing is performed substantially simultaneously with the severing operation of said cutter.

21. Apparatus as claimed in claim 20, wherein said sealing and severing operations are carried out with the assistance of ultrasound.

22. Apparatus as claimed in claim 21, including a cutting and sealing element having a first flat part for sealing a margin of a portion of the web to be severed and a narrow edge part abutting said flat part for severing said portion.

23. Apparatus as claimed in claim 1, including means for cleaning said cutters at a position downstream of said cutting region.

24. Apparatus as claimed in claim 1 or 23, including means for periodically moving said cutters in a direction which is substantially radial relative to said drum, so as to retract the cutter during part of each revolution of the drum.

25. Apparatus for making successive longitudinally-spaced cuts in a web, comprising means for moving the web, means for periodically bringing a cutter into the region of the web, the cutter being carried by a rotary drum and cooperating with an anvil in a cutting region, and adjustable means for mounting the anvil so as to adjust the spacing between the anvil and the cutters, said adjustable means including means determining said spacing including rotatable means acting between the anvil and the drum, and means for producing high frequency relative vibration between the cutter and the web, so that the cutter makes at least one cut having at least a portion extending in a direction transverse of the web, wherein the cutter has a cutting edge arranged to sever portions of predetermined close shape from the web, the web comprising at least two layers of material carrying spaced doses of material to be packaged between the layers and said severed portions of the web corresponding to individual packages containing said material to be packaged.

26. Apparatus as claimed in claim 1 or 9, including a further rotary drum arranged to receive said sections of the web from said rotary drum.

27. Apparatus as claimed in claim 1, wherein said rotatable means includes roller means supporting the anvil and running on the surface of said drum.

28. A method as claimed in claim 27, wherein at least part of the peripheral margin of the package is sealed with the assistance of ultrasound substantially simultaneously with the cutting step.

29. Apparatus as claimed in claim 28, wherein the adjustable means comprises a first frame member carrying the anvil, a second frame member carrying roller means contacting the drum, and means for adjustably mounting the first frame member relative to said second frame member.

30. Apparatus as claimed in claim 28, wherein said rotatable means includes roller means supporting the anvil and running on the surface of said drum.

31. Apparatus for making successive longitudinally-spaced cuts in a web, comprising means for moving the web, means for periodically bringing a cutter into the region of the web, the cutter being carried by a rotary drum and cooperating with an anvil in a cutting region, ultrasound generator means connected to said anvil for producing high frequency relative vibration between the cutter and the web, so that the cutter makes at least one cut having at least a portion extending in a direction transverse of the web, the cutter being arranged to sever successive portions of the web from the remainder of the web, said rotary drum carrying a plurality of said cutters in equally spaced peripheral positions and being provided with suction means for retaining portions in said spaced positions between said cutters on the periphery of said drum after severing, means for transferring said spaced portions from said drum at a position angularly displaced from the position at which said portions are severed from the web, the ultrasound generator means and anvil being supported by a first frame member which is adjustably supported by a second frame member carrying roller means which contact said rotary drum and determine the position of the second frame member relative to said cutters, and positional adjustable means for setting the position of the first frame member relative to the second frame member, whereby the spacing between the anvil and the cutters may be precisely determined.

32. Apparatus as claimed in claim 31, wherein the loading means is provided for ensuring contact between the roller means of said second frame member and said drum, said loading means acting directly on said first frame member which transmits the loading force to said second member.

33. Apparatus as claimed in claim 32, wherein the spacing adjustable means comprises a first frame member carrying the anvil, a second frame member carrying roller means contacting the drum, and means for adjustably mounting the first frame member relative to said second frame member.

34. Apparatus as claimed in claim 31, 32 or 33, wherein the position of the anvil relative to the cutter is determined by at least one linearly movable adjustment means.

35. Apparatus as claimed in claim 1 or 32, further including means for applying adhesive to said portions after they have been severed from the web.

36. Apparatus as claimed in claim 32, wherein said first frame member is slidably movable relative to said second frame member in a direction which is substantially radial relative to said drum, said positional adjustable means acting in opposition to said loading means to determine the position of said first frame member relative to said second frame member.

* * * * *